June 18, 1963

S. GAULEY 3,094,104

RECORDER PEN

Filed May 31, 1962

INVENTOR.
SHERMAN GAULEY
BY Frank C. Parker
David E. Dougherty
ATTORNEYS

United States Patent Office 3,094,104
Patented June 18, 1963

3,094,104
RECORDER PEN
Sherman Gauley, Irondequoit, N.Y., assignor to Bausch & Lomb Incorporated, Rochester, N.Y., a corporation of New York
Filed May 31, 1962, Ser. No. 198,929
4 Claims. (Cl. 120—42.06)

This invention relates to a novel recorder pen of the type used in strip chart recorders.

Strip chart recorders have come into wide spread use in conjunction with electrical test equipment. Recorders of this type are responsive to frequent changes indicated by the electrical equipment. These changes are often rapid and require a pen to move a relatively long distance in a relatively short interval of time. At other times the pen is moved over a comparatively lesser distance during a similar time interval. Frequently a pen is temporarily withdrawn from use which may cause the ink to dry in the point. Such hardening impedes the flow of ink when the pen is returned to service. It is desirable therefore to have a pen wherein the flow of ink is responsive to rapid changes and thereby will produce a relatively uniform line notwithstanding relatively large changes in the rate of movement.

Advantageously, a recorder pen according to the present invention incorporates an integral spring needle which passes through and protrudes slightly beyond a stylus. This feature overcomes to a high degree the problem of ink drying on the pen point during periods of non use. The spring needle moves axially within the stylus or outer tube to provide an ink flow when the point is brought into contact with a surface. There is also a small degree of lateral movement of the needle within the outer tube which enhances the response of the pen even though the pen remains in contact with the strip chart during periods of non use.

A recorder pen according to the present invention produces a relatively even line notwithstanding large changes in the rate of movement. The configuration permits operation through a 90° change of attitude. The needle exhausts the ink supply, and venting below the ink level is maintained in either, or any intermediate position. This latter feature facilitates the production of a portable unit. Accordingly the novel pen incorporates a feature which tends to minimize the possibility of spilling the ink during movement of the device.

The novel pen disclosed herein includes a self contained ink supply and may be refilled from a squeeze bottle. The tendency for ink to form a rivulet from the filler (vent) discharge point directly to and out through the needle has been minimized. The use of a non wettable plastic material such as polypropylene or polyethylene in the body of the pen tends to overcome this problem.

An additional feature which has been found to be advantageous is the removable top. The top may be removed for replacing the spring needle or for cleaning the device prior to changing the color of ink in the reservoir. The pen is relatively durable in service, relatively inexpensive to manufacture and may be filled or cleaned with a minimum of inconvenience.

Briefly, a recorder pen according to the present invention includes means defining a reservoir having a shape generally similar to a rectangular box for containing a supply of ink. A U-shaped vent tube extends through a base of the reservoir at the rear portion thereof. The opposite end of the U-shaped vent tube is disposed in the forward base portion in the proximity of the point. A feed tube or stylus generally similar to a hypodermic needle extends through the forward portion of the base of the reservoir. An annular wall extends upwardly from the inner surface of the base portion of the reservoir. The wall is located between one end of the vent tube and the point. The annular wall is in coaxial alignment with the feed tube and has a generally cylindrical shape circumscribing the feed tube; however, it includes means defining a longitudinal opening which allows ink to flow to the feed tube.

A spring needle includes a spiral spring portion and a straight portion. The straight portion extends through the feed tube and the spring extends upwardly therefrom and rests against the top of the reservoir. The straight portion extends through the feed tube and when a slight force is exerted on the extended portion it is pushed upwardly into the feed tube. An adapter is provided at the rear of the base portion of the reservoir for receiving a squeeze bottle or cartridge for filling or emptying the reservoir. The vent tube is connected to a thin adapter, and serves also as a filling tube.

The invention will now be described in more detail in connection with the accompanying drawing, in which.

Figure 1:
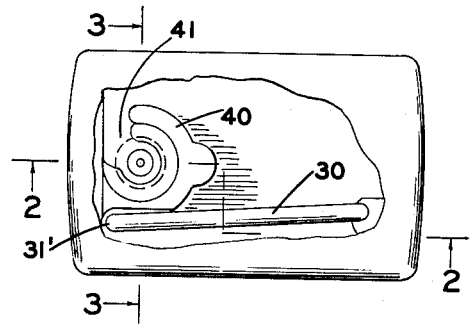
FIG. 1 is a top elevation view partly broken away of a recorder pen according to the invention.
Figure 2:
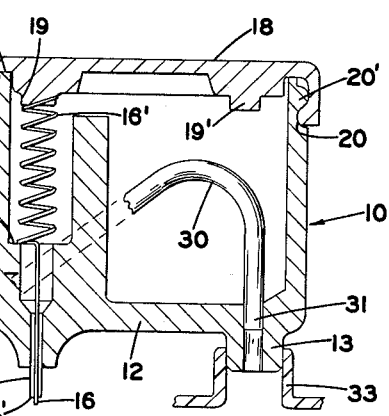
FIG. 2 is a cross sectional view taken along the line 2—2 of FIG. 1.
Figure 3:
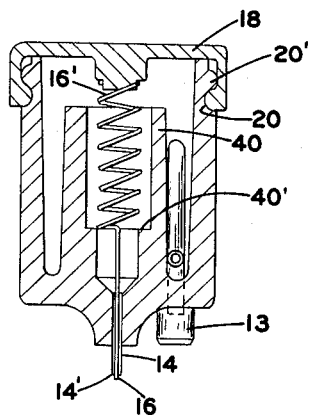
FIG. 3 is a fragmentary cross sectional view taken along the line 3—3 of FIG. 1
Figure 4:
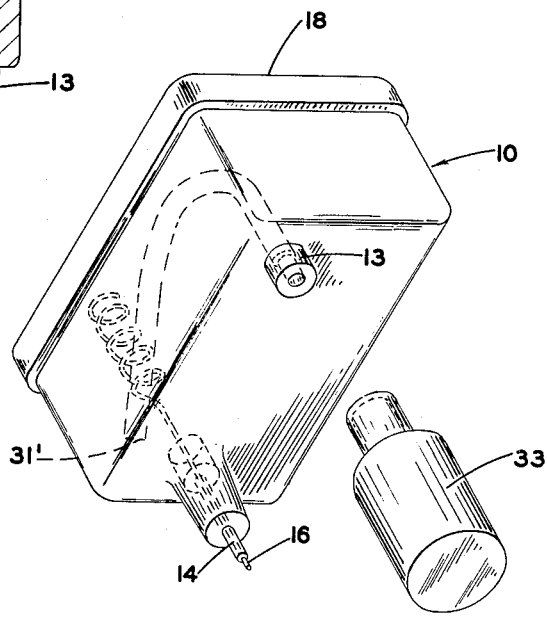
FIG. 4 is a perspective view of the recorder pen shown in FIGS. 1–3.

A recorder pen according to the invention comprises a reservoir 10 having a shape generally similar to a rectangular box. The reservoir 10 is constructed by molding a non-wettable plastic compound such as polypropylene or polyethylene. The use of a non-wettable plastic compound for molding the reservoir tends to overcome the problem associated with ink running out of the pen point during the filling operation.

A hollow needle 14 forms the stylus of the pen and extends through a base 12 of the reservoir 10. A pin 16 extends through the needle 14 in approximately axial alignment with the needle 14. The pin 16 includes an integral coil spring 16' disposed within the reservoir. The spring 16' engages a top 18 of the reservoir 10. The top 18 includes a projection 19 which tends to position the spring portion 16' of the pin 16. The projection 19 is disposed above the needle 14 and is in approximate alignment therewith. The spring portion 16' biases the pin 16 through the needle 14. The pin 16 in its fully extended position extends approximately .015" past the end 14' of the needle 14.

A generally U-shaped vent tube 30 is disposed within the reservoir. One end 31 of the vent tube 30 is fitted into an opening at the bottom of the reservoir 10. This opening passes through a protrusion 13 at the rear corner of the reservoir 10. The protrusion 13 is adapted to receive an ink squeeze bottle 33 for filling the reservoir 10. The pen is filled by injecting a supply of ink through the vent tube.

The free end of the vent tube is located at the bottom of the reservoir, whether the pen is operated in the normal (upright) position, or tilted 90° to place the stylus horizontal and the vent at the top.

An annular wall 40 defining a longitudinal slot 41 extends upwardly from the base 12 within the interior of the reservoir 10. The annular wall 40 separates the end portion 31' of the vent tube 30 from the needle 14 thus preventing the ink from flowing directly from the end of the vent tube and out through the needle before the reservoir is filled. The slot 41 which is located on the side of the reservoir opposite the vent tube 30 allows ink to flow through it and into the needle 14. The annular wall 40 has a shape generally similar to a right circular cylinder and is in approximate coaxial alignment with the needle 14. The wall 40 also acts as a spring retainer for the coil spring 16' which is fitted inside the annular wall 40. A shoulder 40' acts as a stop for the spring portion 16'.

The top 18 which is also molded of a non-wettable plastic material includes fastening means including a continuous bead 20 running around the periphery of the lid, inside a flange. A corresponding bead exists on the outside periphery of the reservoir. The dimensions of these beads 20 and 20' are such that tension is developed in the assembly, causing a sealing portion 21 of the reservoir to press a flat portion of the top. The sealing portion 21 and flat portion of the top 18 form a tight seal to prevent ink spillage. This seal is effective notwithstanding the attitude of the pen.

The top portion 18 also includes a second projection 19' which is symmetrically located with respect to the projection 19. The symmetric shape including projections 19, 19' facilitates assembling the pen since the top 18 may be put on either way.

In operation ink flows from the reservoir through the slot 41, and through the needle 14 to a chart (not shown). The ink flow is caused by capillary action since the area between the needle 14 and the pin 16 is generally similar to a capillary tube. The spring portion 16' biases the pin 16 through the needle 14 however the bias is overcome by the pressure of the pen on a chart. The movement of the pen across the chart also tends to produce a small lateral movement which enhances the ink flow.

In the preferred embodiment this lateral movement has a magnitude of approximately .005" since the outer tube has an inner diameter of approximately .010" diameter and the needle has an outside diameter of approximately .005". The needle 14 and pin 16 according to the preferred embodiment are manufactured of stainless steel in order to prevent corrosion thereof.

What is claimed is:

1. A recorder pen comprising means consisting essentially of non-wettable plastic material defining a generally box shaped reservoir for holding a supply of ink, a hollow needle extending through a base portion of said reservoir defining means, and a generally U-shaped vent tube disposed within the reservoir, an adapter formed integrally with the base of said reservoir defining means to thereby constitute a second base portion, a first end of said U-shaped vent tube extending through the second base portion and associated with said adapter for having a supply of ink injected through said adapter and said vent tube for filling the reservoir, a second end of said vent tube disposed within said reservoir relatively close to an inner portion of said hollow needle, an integral pin coil spring unit, the spring portion of said unit biasing the pin portion through said hollow needle in a direction away from said reservoir whereby movement of said pin within said tube improves the flow of ink to the point of the pen.

2. A recorder pen according to claim 1 in which said reservoir defining means and a top portion of said reservoir defining means each include removable cooperating means fastening and means sealing said top portion to said reservoir defining means, and said cooperating means integrally formed in said reservoir defining means and said top portion respectively.

3. A recorder pen according to claim 1 in which said top portion includes positioning and retaining means integrally formed therein for positioning and retaining said coil spring in a predetermined location, and a second positioning and retaining means symmetrically located with respect to said first positioning and retaining means for positioning and retaining said coil spring in place when said rectangular top portion is rotated 180° about an axis parallel with the axis of said hollow needle.

4. A recorder pen according to claim 1 which includes an upwardly extending annular wall disposed within the reservoir and located between the first end of said vent tube and said hollow needle, said annular wall defining a shape generally similar to a right circular cylinder and including means defining a longitudinal slot on a side thereof opposite from the side adjacent said vent tube for allowing ink to reach said needle and for retaining said spring in position.

References Cited in the file of this patent

UNITED STATES PATENTS

| 739,319 | Jones | Sept. 22, 1903 |
| 1,064,754 | MacGahan | June 17, 1913 |
| 1,800,198 | Carter | Apr. 14, 1931 |
| 2,678,633 | Holden et al. | May. 18, 1954 |

FOREIGN PATENTS

| 929,392 | Germany | June 27, 1955 |